Figure 1:
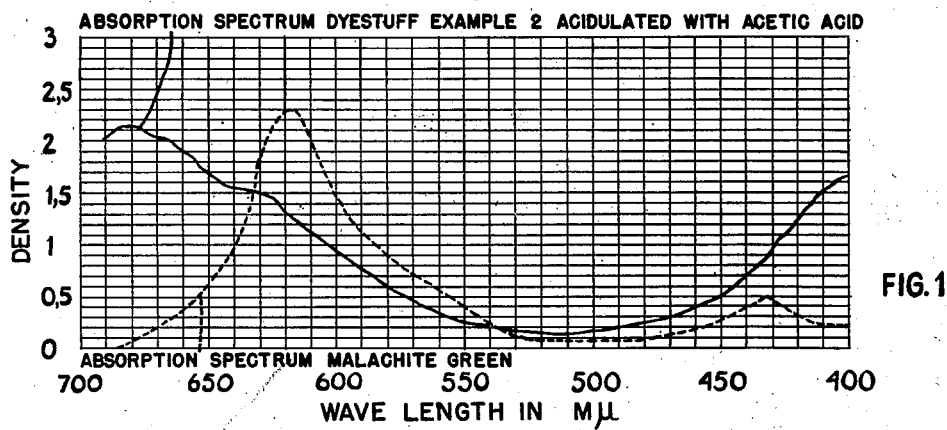

INVENTOR.
JACOB JOSEPH JENNEN
BY
AGENT

Patented Sept. 23, 1952

2,611,698

UNITED STATES PATENT OFFICE 2,611,698

COLORED PHOTOGRAPHIC LAYER

Jacob Joseph Jennen, Antwerp, Belgium, assignor to Gevaert Photo-Producten N. V., Mortsel-Antwerp, Belgium, a company of Belgium Application August 4, 1947, Serial No. 766,099
In Germany May 22, 1941

Section 1, Public Law 690, August 8, 1946
Patent expires May 22, 1961

5 Claims. (Cl. 95—8)

The present invention relates to colored photographic layers containing hydroxy-oxo-polymethine dyestuffs wherein two carbon atoms of the polymethine chain are linked together by means of an outward bridge so as to form a closed ring, and obtainable, for instance, according to the method disclosed in my co-pending application Serial No. 766,097, filed August 4, 1947.

It is known in the photograph industry to use colored layers for various purposes, for instance, filter layers, anti-halation layers, emulsion layers, supports, dark room filters and so on. As further known, filter layers may be obtained by using benzol derivatives of cyclic compounds, indophenols and acid azo dyestuffs. The use of such filter layers, however, entails the risk that the dyestuffs desensitize the emulsion layers adjacent to the colored filter layers, or color the photographic baths. Also, the dyestuffs sometimes have no satisfactory steeply-running absorption spectrum. On the other hand, the absorption maximum of the dyestuffs should be sufficiently wide for anti-halation layers.

Hitherto, only the triphenylmethane dyestuffs of the malachite green series were considered as suitable anti-halation layers for panchromatic material, but the latter dyestuffs do not absorb all red rays; most of them absorb the light but to 650 mµ. Moreover, they show a green gap so that the green rays practically are not absorbed. Dyestuff mixtures consequently had to be used for the preparation of practically usable anti-halation layers. Dark room filters were also obtained in the same way.

Further, it is known to use cyanine dyestuffs to obtain infra-red filters, but the action of these dyestuffs, too, has to be completed by other dyestuffs.

Finally, polymethine dyestuffs, which contain an enol or keto group in the two rings belonging to these dyestuffs in o-position to the end carbon atoms, may be used, as is known, for filter layers. Such keto-hydroxy dyestuffs, however, are not better suited for the preparation of impeccable filter layers or anti-halation layers than the forementioned dyestuffs, at the very least in panchromatic material, owing to their insufficient red-absorption.

The primary object of my invention is to generally improve colored photographic layers.

An important object of my invention is to provide new colored photographic layers.

More particularized objects of this invention center about the provision of photographic filter layers and anti-halation layers.

Further objects will appear from the following description.

These objects are accomplished by incorporating in the layer a polymethine dyestuff of the following general formula:

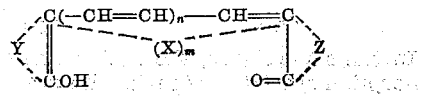

wherein $n$ and $m$ are 1 or 2, Y and Z are non-metallic atoms necessary to complete a carbocyclic or heterocyclic ring having optionally a fused-on arylene group, X is non-metallic atoms required to complete a carbocyclic or heterocyclic ring both having optionally a fused-on arylene group with any two carbon atoms of the polymethine chain, X, Y and Z may represent either identical or different rings, $n$ being 1 in case of trimethine dyestuffs, $n$ being 2 in case of pentamethine dyestuffs.

The hydrogen of the enol group may be replaced by metals, such as Na, K, Ca or Ag, or by organic radicals, such as triethylammonium, acetyl, etc.

The dyestuffs of my invention can easily and economically be manufactured. They may be produced by condensing carbocyclic or heterocyclic five or six-membered compounds having optionally a fused-on arylene group and containing a reactive methylene group adjacent to a CO group with compounds of the following general formulae:

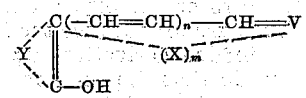

or

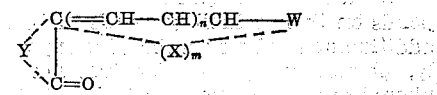

wherein the different symbols have the above mentioned significance, and V is O, N-aryl or (—O—alkyl)₂ and W is —OH, —ONa, —O-alkyl, —O—CO-alkyl, —O—CO-aryl or a substituted group or halogen.

The dyestuffs according to my invention are best suited to be used for filter and anti-halation layers, for they show favorable absorption spectrums and are easily discolored in the alkaline developing bath.

The kind of bridge linking two carbon atoms of the polymethine chain may largely influence the absorption spectrum of the keto-hydroxy dyestuff. For instance, the presence of an ortho-phenylene bridge in a compound with linear chain causes displacement of the absorption maximum to the longer wave lengths from 530 to 680 mμ, as well as the widening of the band and the rounding of the maximum. This evidently means an increased anti-halation effect.

In Fig. 1 of the accompanying drawing, the full line shows the absorption spectrum of 1-phenyl - 3 - methyl - 5-hydroxy-pyrazolyl-alpha-alpha'-ortho-phenylene trimethine - 1-phenyl-3-methyl-5-pyrazolone-beta-sodium carboxylate or its disulphonic acid. The formula of this dyestuff is as follows:

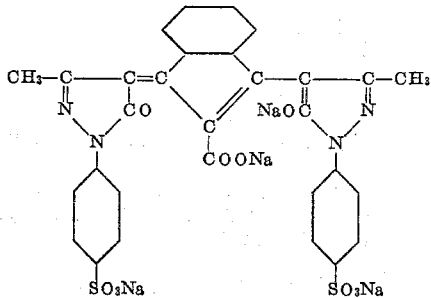

In the same figure, the dotted line shows the absorption spectrum of malachite green.

Figure 2:
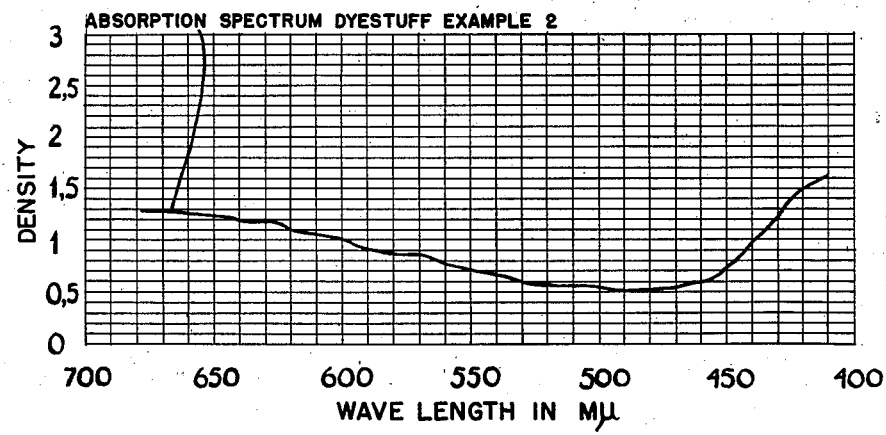
Figure 3:
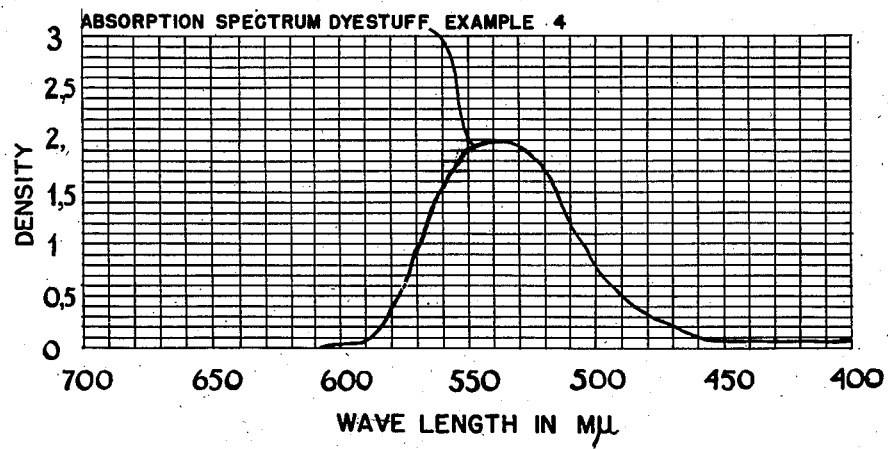

In Figs. 1, 2 and 3, the abscissae represent the wave lengths in mμ, and the ordinates the density.

For the purpose of anti-halation, the dyestuff may be blackened still more intensely, i. e., an even absorption of all rays of the visible spectrum may be obtained by addition of a small acid quantity, as illustrated in Example 2 further below and in the spectrum of Fig. 2.

Analogous results are obtained when one or more groups of the two atoms of the bridge are shared by side nuclei. As starting materials, indanedione derivatives may be replaced by perinaphthindanedione or its derivatives as, for instance, 8 - phenylperinaphthindanedione-7-9 (J. Am. Chem. Soc. 59, 2168 (1937)), or more reactive derivatives obtainable from naphthalic anhydride or nitronaphthalic anhydride and para-nitrophenyl acetic acid. Other ring systems may be introduced, for instance, by using dimalonyl-perylene as a starting material (German Patent 408,513). In order to succeed in the preparation of more complicated dyestuffs, groups as, for instance, bromo, nitro or carboxyl groups may be introduced. Such groups advance the isomerisation in the oxyindone derivatives whereby one must pay attention that the color formation be not checked by any steric hindrance.

The discoloring speed of these dyestuffs depends on their solubility and is furthered by the addition of sulpho or carboxyl groups. Contrarily, phenol groups as, for instance, the three phenyl groups of Example 4 given below slacken the discoloring speed.

The diffusion of the filter dyestuffs is prevented by replacing the enol hydrogen either by substituted ammonium radicals or by metals as silver, shown in Example 3 further below, or by introducing heavy radicals as naphthyl or biphenyl into the pyrazolone rings. The diffusion may also be prevented by using dyestuffs with a large molecular weight, for instance, dyestuffs obtained from pyrazolone and dehydrothiotoluidine or dyestuffs containing three 1-1'-(di-phenylene-4-4'-)-bis-(3-methyl-5-pyrazolone) nuclei.

The dyestuffs according to my invention may also be used as filter layers in a multi-layer material, for instance, the magenta dyestuff 1-phenyl - 3 - methyl - 5-hydroxypyrazolyl-alpha'-beta - (3' - phenyl - 5'-methyl-3'-4'-pyrazolo-) - trimethine - 1 - phenyl-3-methyl-5-pyrazolone as green filter, as shown in Example 4 further below.

As filter for dark room lighting or for microphotographic purposes, the stabler unsulphonated dyestuffs are used.

The new dyestuffs may be rendered substantive towards gelatine in a known way, namely, by introducing the substantive groups according to U. S. Patent No. 2,058,725. Here it should be noted that the green dyestuff of the formula in Example 2, by its own structure, has already substantive properties towards gelatine.

My new dyestuffs may be dispersed in gelatine, gum arabic, collodion, synthetic resins or other suitable colloids and may be coated upon the support in any fashion. The dyestuffs may also be incorporated in the photographic emulsions, e. g., silver halide gelatine emulsions, in order to eliminate the diffusion halation for they have no harmful effect on the photographic layer, latent image or developed silver image.

Some specific examples of dyestuffs of my invention are given hereinafter.

*Example 1*

The dyestuff of the following formula:

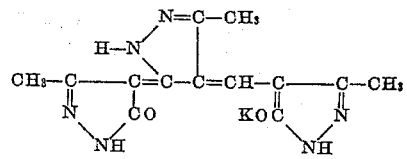

is obtainable from methylpyrazolone and diphenyl formamidine and is suited for the preparation of an anti-halation layer for orthochromatic material. 64 g. gelatine, 1 g. saponine and 4 g. dyestuff are dissolved in 800 g. water and at 40° C. coated upon a support, e. g., a photographic plate, which is then dried by air.

*Example 2*

The dyestuff of the following formula:

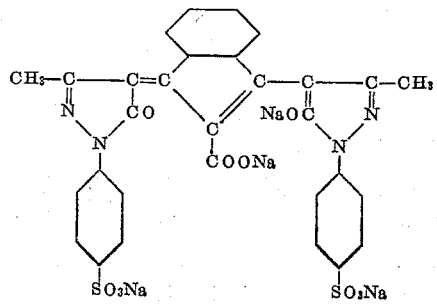

is obtained as follows:

0.01 mol sodium oxindone-sodium carboxylate and 0.01 mol phenylmethylpyrazolone-p-sodium sulphonate are dissolved in 60 cm.³ warm water. From this solution quickly turning to dark red a finely divided dyestuff soluble in water and of magenta color precipitates while cooling. This dyestuff is to be regarded as 1-sulphophenyl-3-methyl-4-(3'-oxohydrindylidene)-5- pyrazolone-2'-sodium carboxylate. The solution of this product when heated with 0.01 mol phenylmethylpyrazolone sodium sulphonate turns successively to black and dark green. The new dyestuff is salted out by means of sodium chloride, filtered under suction and washed with a 20 per cent sodium chloride solution until the filtrate runs down clearly.

100 g. of the obtained dyestuff are dissolved in 2 l. water 1 l. acetic acid. After some time, the crystallized dyestuff is filtered under suction, washed with 50 per cent acetic acid and dried. In a 1/20,000 aqueous solution, the black dyestuff shows a nearly even strong absorption all over the spectrum (see the spectrum of Fig. 2). The layer thickness of the solution is 2 cm.

*Example 3*

The dyestuff of the following probable formula:

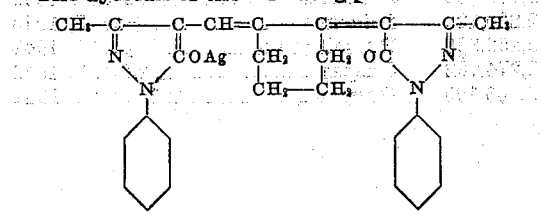

obtained from phenylmethylpyrazolone and hydroxymethylenecyclohexanone is salted out from the methyl alcoholic solution by means of a 4 per cent sodium chloride solution and purified by boiling out with benzene. Whilst constantly stirring a solution of 0.7 g. silver nitrate in 100 cm.³ 10 per cent gelatine is introduced into a solution of 1 g. of the dyestuff in 20 cm.³ ethyl alcohol and 1 cm.³ of arozine. Thus, a color gelatine is obtained which can be used to coat non-diffusing filter layers.

*Example 4*

In order to obtain an absolutely pure green filter, 2 g. potassiumhydroxide, 8 g. phenylmethylpyrazolone and 10 g. methenyl-bis-phenylmethylpyrazolone are successively dissolved in 250 cm.³ methyl alcohol. After 7 hours' heating on a water bath at 75–80° C., an intense magenta solution is formed. This solution is cooled, and the next day the obtained crystals having the form of bronze-colored fine needles are filtered under suction. The needles are dissolved in methyl alcohol and this solution is poured into diluted hydrochloric acid. The precipitated dyestuff is filtered, washed and recrystallized from methyl alcohol, further dissolved in 300 cm.³ benzene and shaken with 10 cm.³ of strong aqueous ammonia. The dyestuff of the following probable formula:

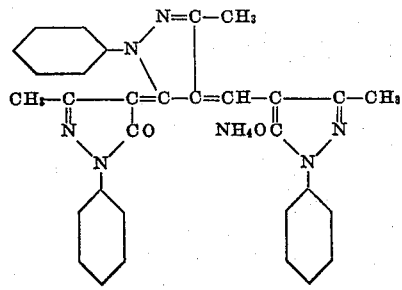

is obtained (see the spectrum of the methyl alcoholic solution 1/160,000 shown in Fig. 3).

It is believed that my invention and the specific examples, as well as the advantages thereof, will be apparent from the foregoing detailed description. It will also be apparent that while I have shown and described preferred examples of my invention, changes may be made without departing from the spirit of the invention, as sought to be defined in the following claims.

I claim:

1. A sensitive photographic element comprising a support having thereon a light-sensitive silver halide emulsion layer and a filter layer containing a dyestuff of the following formula:

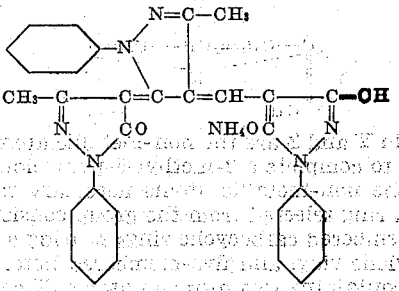

2. A sensitive photographic element comprising a support having thereon a light-sensitive silver halide emulsion layer and an antihalation layer containing a dyestuff of the following formula:

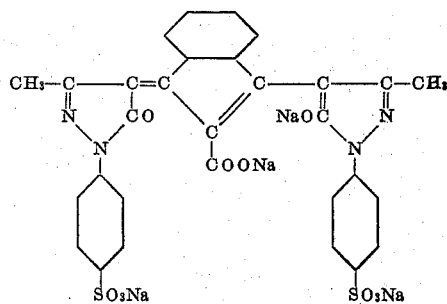

3. A sensitive photographic element comprising a support having thereon a light-sensitive silver halide emulsion layer and a colored layer containing a dyestuff of the general formula:

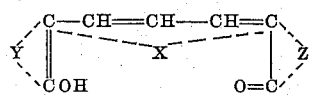

wherein Y and Z are the non-metallic atoms necessary to complete a 3-methyl-5-pyrazolone ring, X is the non-metallic atoms necessary to complete a ring selected from the group consisting of five-membered carbo-cyclic rings bearing a fused-on arylene ring, and five-membered heterocyclic rings containing two nitrogen atoms, X completing said ring by substituting two hydrogen atoms of the trimethine chain, said hydrogen atoms belonging to two carbon atoms selected from the group consisting of two neighboring carbon atoms and two carbon atoms separated by one methine group.

4. A sensitive photographic element comprising a support having thereon a light-sensitive silver halide emulsion layer and a filter layer containing a dyestuff of the formula:

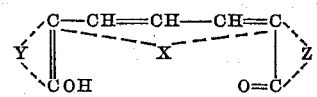

wherein Y and Z are the non-metallic atoms necessary to complete a 3-methyl-5-pyrazolone ring, X is the non-metallic atoms necessary to complete a ring selected from the group consisting of five-membered carbocyclic rings bearing a fused-on arylene ring, and five-membered heterocyclic rings containing two nitrogen atoms, X completing said ring by substituting two hydrogen atoms of the trimethine chain, said hydrogen atoms belonging to two carbon atoms selected from the group consisting of two neighboring carbon atoms and two carbon atoms separated by one methine group.

5. A sensitive photographic element comprising a support having thereon a light-sensitive silver halide emulsion layer and an anti-halation layer containing a dyestuff of the general formula:

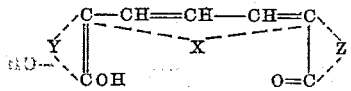

wherein Y and Z are the non-metallic atoms necessary to complete a 3-methyl-5-pyrazolone ring, X is the non-metallic atoms necessary to complete a ring selected from the group consisting of five-membered carbocyclic rings bearing a fused-on arylene ring, and five-membered heterocyclic rings containing two nitrogen atoms, X completing said ring by substituting two hydrogen atoms of the trimethine chain, said hydrogen atoms belonging to two carbon atoms selected from the group consisting of two neighboring carbon atoms and two carbon atoms separated by one methine group.

JACOB JOSEPH JENNEN.

REFERENCES CITED

The following references are of record in the file of this patent:

UNITED STATES PATENTS

| Number | Name | Date |
|---|---|---|
| 2,146,802 | Dersch | Feb. 14, 1939 |
| 2,220,123 | Schwarc | Nov. 5, 1940 |
| 2,256,356 | Russell et al. | Sept. 16, 1941 |
| 2,274,782 | Gaspar | Mar. 3, 1942 |
| 2,345,193 | Gaspar | Mar. 28, 1944 |